United States Patent
Cok

(10) Patent No.: US 9,519,080 B2
(45) Date of Patent: Dec. 13, 2016

(54) HIGH-ASPECT-RATIO IMPRINTED STRUCTURE

(71) Applicant: Ronald Steven Cok, Rochester, NY (US)

(72) Inventor: Ronald Steven Cok, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 289 days.

(21) Appl. No.: 14/230,021

(22) Filed: Mar. 31, 2014

(65) Prior Publication Data

US 2015/0276988 A1  Oct. 1, 2015

(51) Int. Cl.
  *G02B 1/10* (2015.01)
  *G02B 5/00* (2006.01)
  *E06B 9/24* (2006.01)

(52) U.S. Cl.
  CPC . *G02B 1/10* (2013.01); *E06B 9/24* (2013.01); *G02B 1/105* (2013.01); *G02B 5/003* (2013.01); *E06B 2009/2405* (2013.01); *Y10T 428/24802* (2015.01)

(58) Field of Classification Search
  CPC .................................................. G02F 1/133524
  See application file for complete search history.

(56) References Cited

U.S. PATENT DOCUMENTS

| | | | |
|---|---|---|---|
| 3,524,789 A | 8/1970 | Olsen | |
| 2006/0135710 A1* | 6/2006 | Shirrell | C08G 59/621 525/481 |
| 2008/0144179 A1 | 6/2008 | Mimura et al. | |
| 2008/0220520 A1* | 9/2008 | Palecek | A01N 1/02 435/374 |
| 2009/0242110 A1 | 10/2009 | Kasuya | |
| 2011/0303404 A1 | 12/2011 | Tea | |
| 2013/0272648 A1* | 10/2013 | Terada | G02B 6/43 385/14 |

FOREIGN PATENT DOCUMENTS

EP  91306224.6  7/1991

* cited by examiner

*Primary Examiner* — Ian Rummel
(74) *Attorney, Agent, or Firm* — Raymond L. Owens; William R. Zimmerli

(57) ABSTRACT

A high-aspect-ratio imprinted structure includes a first layer of cured layer material having a plurality of micro-channels imprinted in the first layer. Each micro-channel has micro-channel walls and a micro-channel bottom, the micro-channel bottom having distinct first and second portions. Deposited material is located on the micro-channel walls and not on the second portion of the micro-channel bottom.

20 Claims, 15 Drawing Sheets

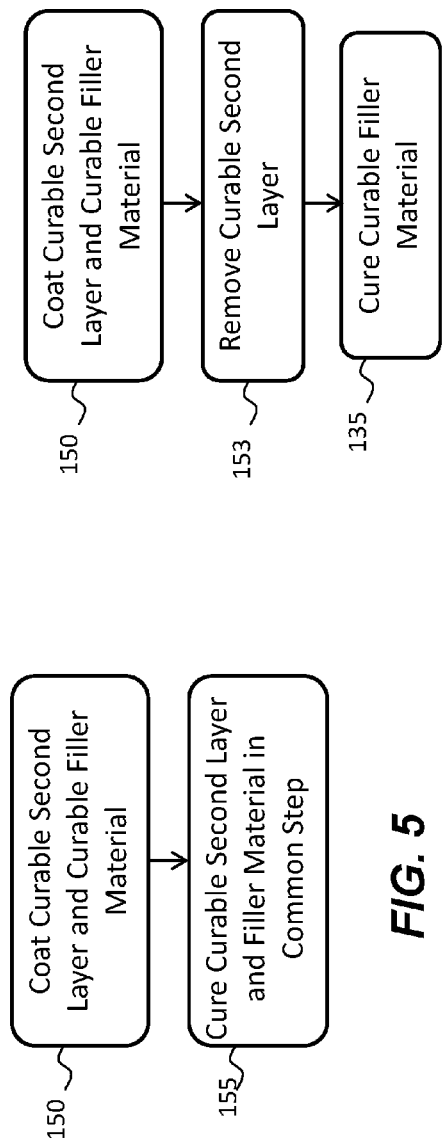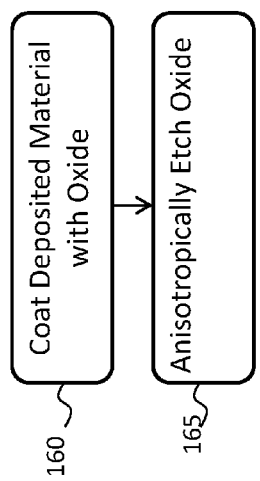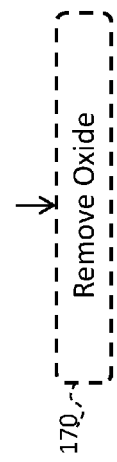

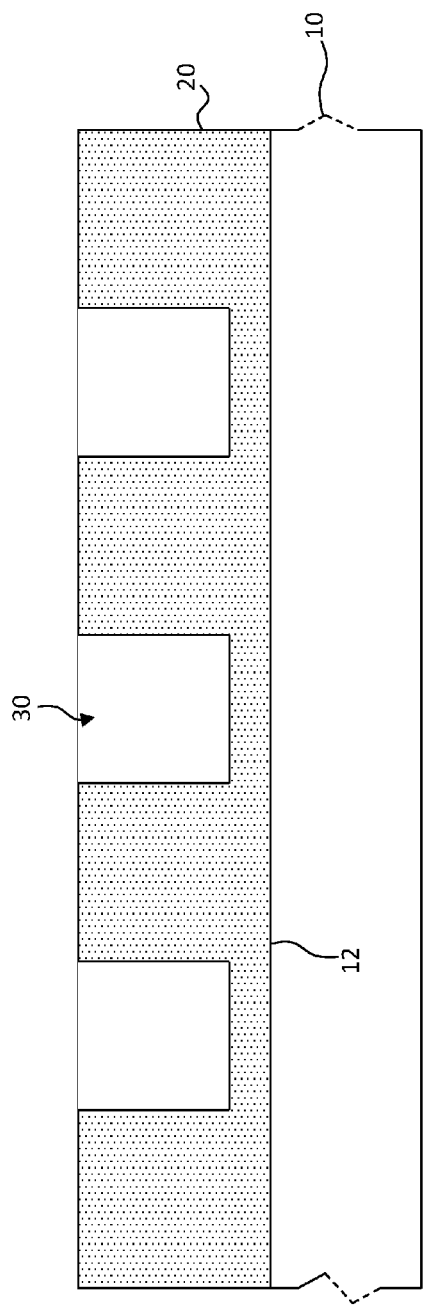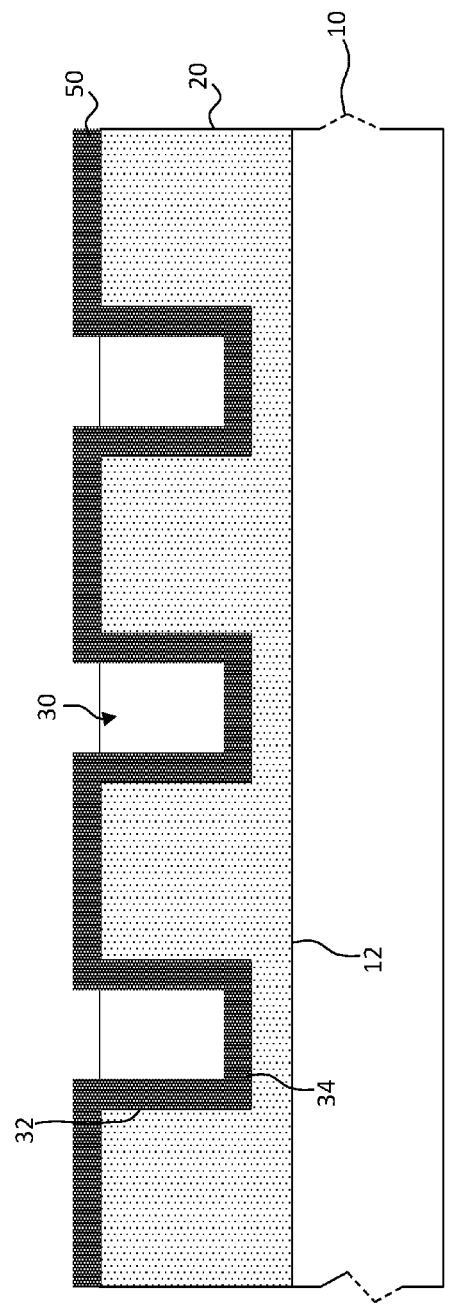

HIGH-ASPECT-RATIO IMPRINTED STRUCTURE

CROSS REFERENCE TO RELATED APPLICATIONS

Reference is made to commonly-assigned U.S. patent application Ser. No. 14/230,024 (now U.S. Publication No. 2015/0279688), filed Mar. 31, 2014, entitled "High-Aspect-Ratio Imprinted Structure Method" by Cok et al the disclosure of which is incorporated herein.

Reference is made to commonly-assigned U.S. patent application Ser. No. 14/060,695, filed Oct. 23, 2013, entitled "Imprinted Micro-Louver Structure" by Cok, the disclosure of which is incorporated herein.

FIELD OF THE INVENTION

The present invention relates to high-aspect-ratio structures having a depth much greater than a width formed in a substrate.

BACKGROUND OF THE INVENTION

Layers formed on or over a substrate are a common element of thin-film devices and backplanes. Such layers are found, for example, in displays, touch screen, and optical films. In some applications, high-aspect-ratio structures having a depth or thickness much greater than a width are useful. For example, micro-louver structures desirably having a reduced viewing angle but a high transparency use high-aspect-ratio light-absorbing structures to form a privacy screen. Optical structures such as phase and amplitude gratings, plasmonic devices, and wire-grid polarizers also use structures with a small width.

Most thin-film devices are constructed using photolithographic techniques in which light-sensitive layers are coated on a surface, exposed through a mask to cure a patterned portion of the light-sensitive layer, and then chemically treated to remove the cured or uncured portions of the light-sensitive layer and layers coated beneath the patterned light-sensitive layer. Very small features, for example, on the order of 500 nanometers to many microns are made using such techniques. Even smaller structures are made using higher-frequency radiation (e.g. ultra-violet radiation) as is well-known in the semiconductor industry. These semiconductor processes tend to be expensive, slow, and limited in size. Furthermore, using such techniques it is often difficult to form high-aspect-ratio structures with a rectangular cross section rather than a structure with undercut edges having a roughly trapezoidal shape.

In one prior-art method described in U.S. Patent Publication 2008/0144179, privacy screens are made by coating a layer of photo-sensitive resin on a first substrate. A mask is used to pattern the photo-sensitive resin. The mask has a pattern corresponding to the arrangement of light-absorbing and transparent material. The pattern is etched into the exposed resin and a layer of curable material is coated over the photo-lithographically etched resin in a vacuum. The curable material is etched to expose the photo-sensitive resin layer, and cured. A transparent second substrate is then laminated to the resin layer. Alternatively, the second substrate is laminated after the resin is etched and curable material wicked into the etched areas using capillary forces, and cured. In yet another method, multiple resin layers having etched areas are laminated together forming gaps and curable material wicked into the gaps using capillary forces, and cured. These methods are limited in the depth they can achieve since photo-lithographic etching has a practical depth limitation or the patterns available are limited to those that can support etching. Furthermore, photo-lithographic processes are relatively expensive and slow.

In other prior-art methods described in U.S. Pat. No. 3,524,789 entitled "Louvered transparent sheeting made by skiving", alternating layers of light-absorbing material and light-transparent material are laminated together. Such layers are formed by extrusion or by laminating pre-formed sheets together, as is also described in European Patent Application Number 91306224.6 entitled "Method of making a flexible louvered plastic film". The laminate is then cut into cross-sectional portions, each portion forming a micro-louver sheet with micro-louvers. Alternatively, alternating layers of light-absorbing material and light-transparent material are formed in cylinders and laminated together. Thin micro-louver sheets are cut from the cylinder with a knife.

These approaches use relatively thick layers of light-absorbing material and light-transparent material that limit the transparency of the resulting micro-louver sheet. It is also difficult to make large micro-louver sheets since it is difficult to cut large, thin sheets, for example using skiving. Furthermore, such sheets typically need additional processing to remove curl and polish the edges.

Imprinting methods generally known in the prior art are an alternative way to make structures in a layer. Such methods typically include coating a curable liquid, such as a polymer, onto a rigid substrate. The polymer is partially cured (through heat or exposure to light or ultraviolet radiation) and then a pattern of micro-channels is imprinted (embossed or impressed) onto the partially cured polymer layer by a master having a reverse pattern of ridges formed on its surface. The polymer is then completely cured.

U.S. Patent Application Publication No. 2009/0242110 describes a method for manufacturing a polarizer that includes transferring a ridge-trough pattern with a mold onto a surface of a substrate formed with a transparent medium, forming a metal layer so as to at least fill a trough portion of the ridge-trough pattern transferred on the substrate, grinding the metal layer and a ridge portion of the ridge-trough pattern transferred on the substrate to form a periodic pattern of a material of the metal layer and the transparent medium, where a period of the ridge-trough pattern is not longer than a wavelength of an incident light flux. Alternatively, U.S. Patent Application Publication No. 2011/0303404 discloses a conformal, multilayer micro-channel structure having a wear-resistant interior micro-channel surface coating of an ALD deposited conformal alumina ($Al_2O_3$) ceramic of about 1000 Angstroms in thickness and a titanium nitride (TiN) of about 300 Angstroms to about 1000 Angstroms in thickness. The $Al_2O_3$/TiN multilayer structure is resistant to erosion and to electro-chemical corrosion as is found in prior-art micro-channel coolers and structures.

Attributes such as transparency, contrast, or reflectivity are important for optical systems. Overall thickness and cost are also important device attributes.

SUMMARY OF THE INVENTION

There remains a need for methods and devices providing high-aspect-ratio structures with useful electrical, opto-electronic, and optical properties. Such devices are preferably simple to construct, provide improved transparency and reduced weight, thickness, and cost.

In accordance with the present invention, a high-aspect-ratio imprinted structure comprises:

a first layer of cured layer material having a plurality of micro-channels imprinted in the first layer, each micro-channel having micro-channel walls and a micro-channel bottom, the micro-channel bottom having distinct first and second portions;

deposited material located on the micro-channel walls and not on the second portion of the micro-channel bottom.

Structures and methods of the present invention provide structures with an increased aspect ratio and improved electrical, opto-electronic, and optical properties, for example transparency and surface quality.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein:

FIGS. 4-7 are flow diagrams according to various embodiments of the present invention; and FIGS. 8-19 are cross-sectional views of a sequence of structures useful in understanding the construction of embodiments of the present invention;

Figure 1:
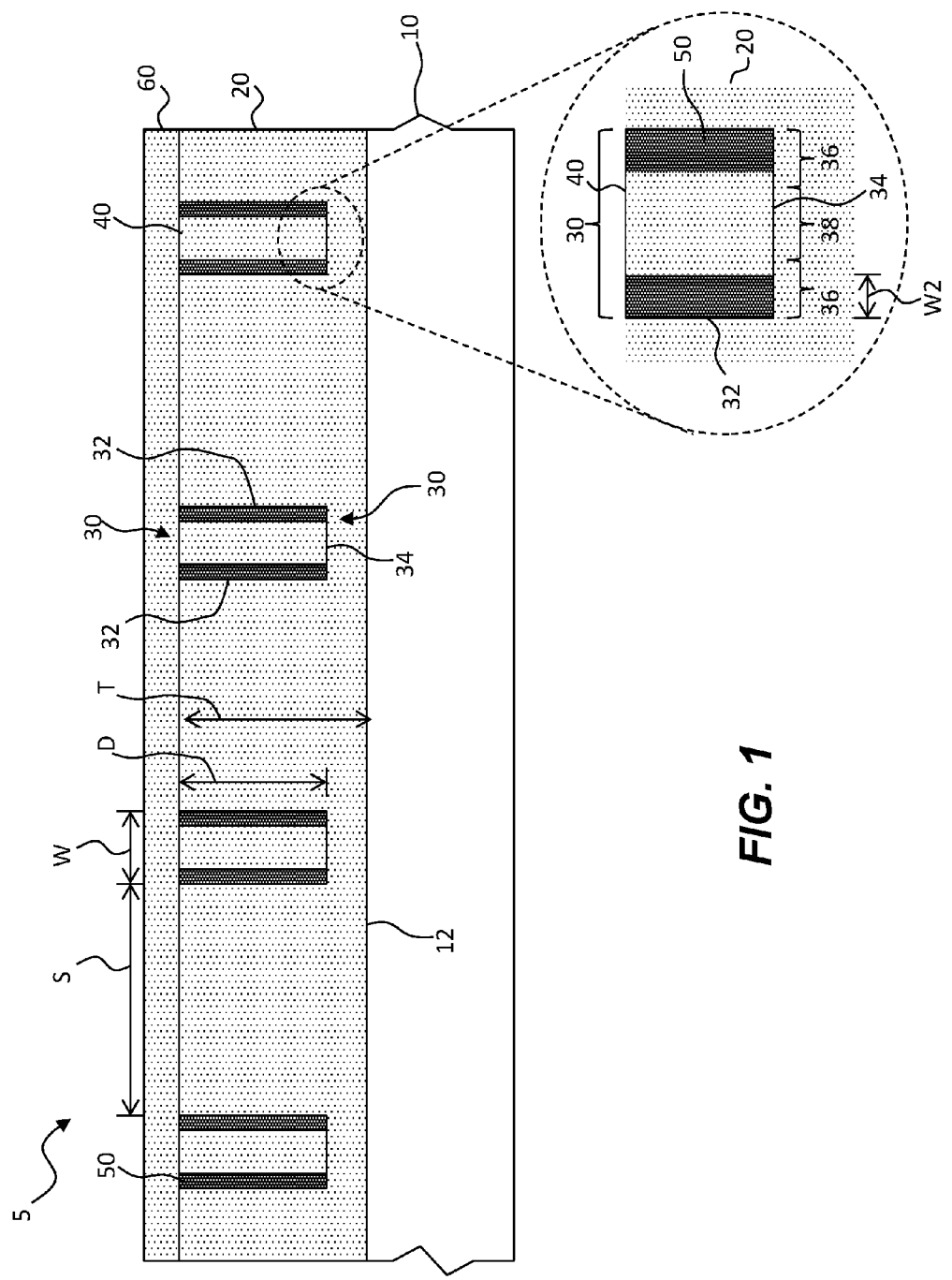
FIG. 1 is a cross-sectional view with enlarged inset of an embodiment of the present invention.

The Figures are not necessarily to scale, since the range of dimensions in the drawings is too great to permit depiction to scale.

DETAILED DESCRIPTION OF THE INVENTION

The present invention is directed to high-aspect-ratio structures formed in a substrate or in layers formed on a substrate and methods for constructing such high-aspect-ratio structures. As discussed herein, a high-aspect-ratio structure is one that is formed on or in a substrate layer and that extends in a direction orthogonal to the substrate surface a distance that is much greater than the distance the high-aspect ratio structure extends in at least one direction parallel to the substrate surface.

Referring to FIG. 1, a high-aspect-ratio imprinted structure 5 according to an embodiment of the present invention includes a first layer 20 of cured material having a plurality of micro-channels 30 imprinted in the first layer 20. Each micro-channel 30 has micro-channel walls 32 and a micro-channel bottom 34. The micro-channel bottom 34 has distinct first and second portions 36 and 38, respectively. Deposited material 50 is located on the micro-channel walls 32 and on only the first portion 36 of the micro-channel bottom 34. The deposited material 50 is not located on the second portion 38 of the micro-channel bottom 34.

In a further embodiment of the present invention, the high-aspect-ratio imprinted structure 5 includes a cured filler material 40 in each micro-channel 30 between the deposited materials 50 and on only the second portion 38 of the micro-channel bottom 34. In yet another embodiment of the present invention, the high-aspect-ratio imprinted structure 5 includes a second layer 60 over the first layer 20 opposite a substrate 10 on which the first layer 20 is located, over the deposited material 50, and over the filler material 40, if present.

According to various embodiments of the present invention, the first layer 20, the filler material 40, and the second layer 60 are made of different materials. In another embodiment, the first layer 20, the filler material 40, and the second layer 60 are made of the same, or include the same, materials. In an embodiment, the first layer 20 is cross linked to the second layer 60. In another embodiment, the second layer 60 is cross linked to the filler material 40. Cross linking the various elements of the present invention imparts mechanical and environmental robustness to the high-aspect-ratio imprinted structure 5. In particular, cross linking the first layer 20 to the second layer 60 or cross linking the second layer 60 to the filler material 40 protects the deposited material 50 from environmental contamination, mechanical abrasion, shock, or other perturbations.

As used herein, a cured layer or material (e.g. the first layer 20, the filler material 40, or the second layer 60) is cured in situ after it has been placed in its final location. Such a curing method enables efficient and effective construction of the elements of the present invention. In embodiments of the present invention, the first layer 20 is made up of cured material that is deposited on a substrate surface 12 of the substrate 10 in an uncured state and then subsequently cured. As indicated in the Figures, the first layer 20 can be in an uncured state, a partially cured state, or a cured state. Likewise, the filler material 40 or the second layer 60 is made up of cured material that is located in the micro-channels 30 or over the first layer 20 in an uncured state and then subsequently cured. As indicated in the Figures, the filler material 40 or the second layer 60 can be in an uncured state, a partially cured state, or a cured state. Suitable materials for the first layer 20, the filler material 40, or the second layer 60 include cross-linkable materials, resins, or polymers that are exposed to heat or radiation to cross link and cure them.

In one embodiment, as illustrated in FIG. 1, the micro-channels 30 of the high-aspect-ratio imprinted structure 5 extend only partially through the first layer 20. As shown in FIG. 1, the micro-channels 30 have a depth D in first layer 20. First layer 20 has a thickness T greater than D. In an alternative embodiment of the high-aspect-ratio imprinted structure 5, illustrated in FIG. 2, the micro-channels 30 extend through the first layer 20 so that, for example the micro-channel bottom 34 contacts the substrate surface 12 so that the depth D of the micro-channels 30 equals the thickness T of the first layer 20. The filler material 40 between the deposited materials on the micro-channel walls 32 also has depth D.

In yet another embodiment, the substrate 10 of the high-aspect-ratio imprinted structure 5 forms a display cover or a display substrate of a display 14.

Figure 2:
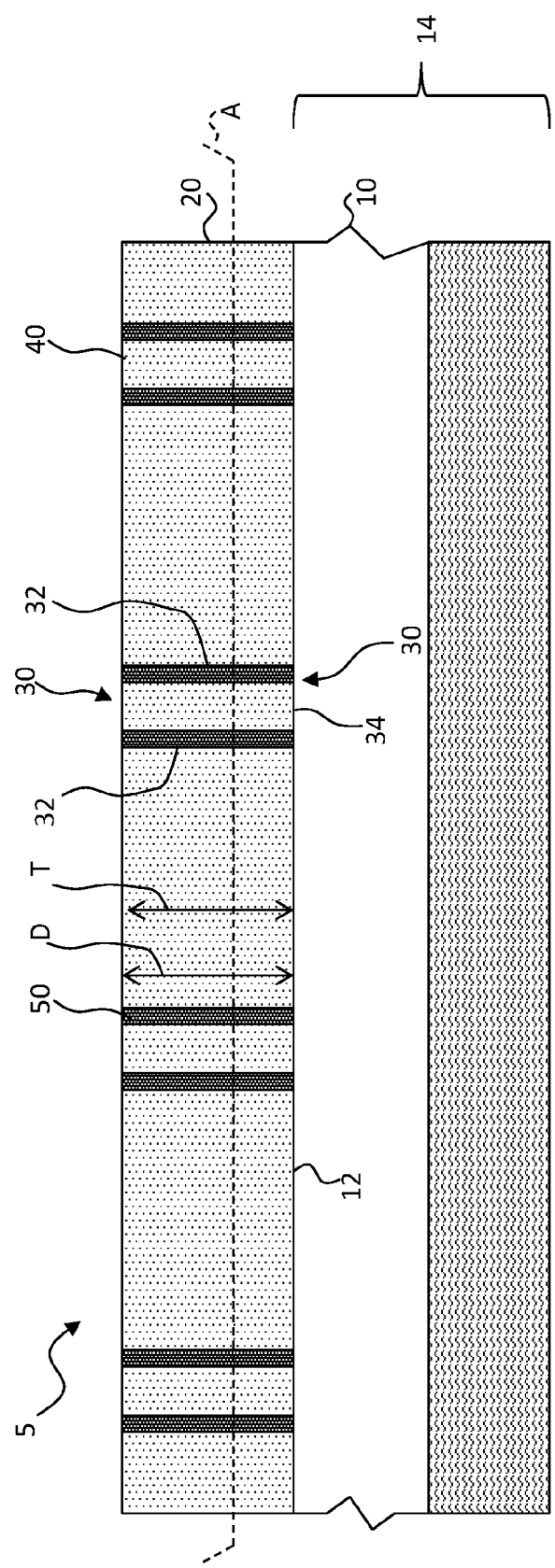
FIG. 2 is a cross-sectional view of an alternative embodiment of the present invention.

The micro-channels 30 of the present invention can have a variety of cross sectional shapes, for example rectangular or trapezoidal and a variety of aspect ratios. Micro-channels with cross-sectional aspect ratios of 6 have been made with widths of 500 nm to 50 microns. Similarly, the deposited material 50 can have a variety of cross sectional shapes. As illustrated in FIGS. 1 and 2, the micro-channels 30, the deposited material 50 on the micro-channel walls 32, and the filler material 40 on the micro-channel bottom 34 have a substantially rectangular cross section taken in a direction perpendicular to the length of the micro-channels 30 and perpendicular to the substrate surface 12.

Figure 3A:
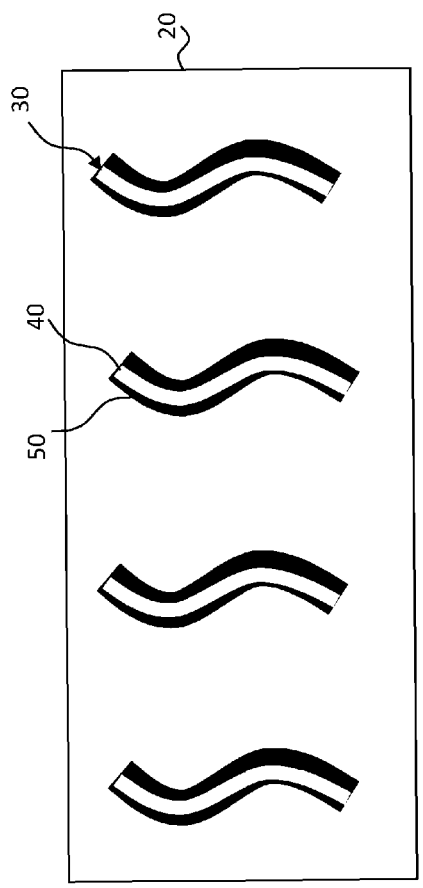
FIGS. 3A and 3B are plan views of other embodiments of the present invention.

Referring to FIG. 3A, each micro-channel 30 extends over or in the first layer 20. In a cross section parallel to the substrate surface 12 along cross section line A (FIG. 2), the micro-channels 30 are not straight, for example having non-collinear line segments (not shown), or is curved (as shown).

Figure 3B:
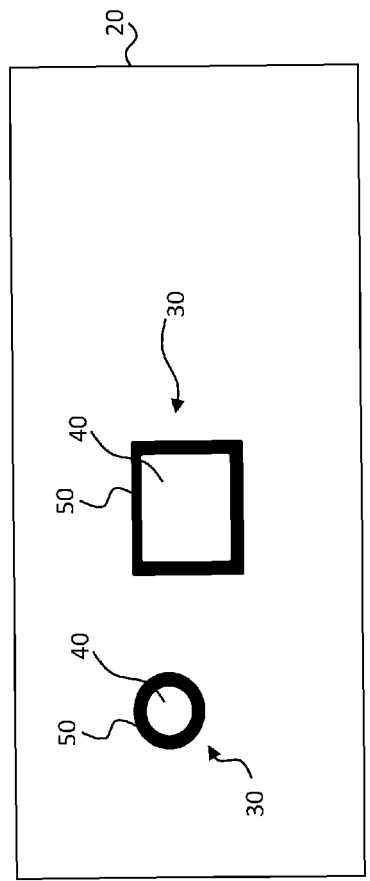

In other embodiments shown in FIG. 3B, the micro-channels 30 do not extend over the substrate surface 12 (FIG. 2) but form localized cubes, cylinders or other geometric shapes. In consequence, the deposited material 50 can form tubes with cross sections having circular shapes, rectangular shapes, hexagonal shapes, or other geometric shapes in the cured first layer 20.

In embodiments of the present invention, the deposited material 50 of the high-aspect-ratio imprinted structure 5 has an aspect ratio greater than 2. Referring back to FIG. 1, the micro-channels 30 have a width W and a depth D that is greater than W, and are separated by a distance S that is greater than the micro-channel width W. The aspect ratio of the micro-channel 30 is defined as the ratio of D divided by W of the cross section of the micro-channel 30. Since the deposited material 50 is only present on the first portion 36 of the micro-channel bottom 34, the aspect ratio of the deposited material 50 is larger than that of the micro-channel 30 and is defined as D divided by width W2 of the deposited material 50 (illustrated as the width W2 of first portion 36 in the inset of FIG. 1). For example, the ratio of the deposited material 50 is greater than 2, greater than 5, greater than 10, greater than 20, greater than 50, greater than 100, greater than 1,000, or greater than 10,000. As shown, the aspect ratio of the deposited material 50 is approximately 10, but the present invention is not limited by the illustrations in the Figures.

In various embodiments of the present invention, the deposited material 50 is a metal or includes a metal. The deposited material 50 can have a transmissivity of less than 50%.

In other embodiments, the high-aspect-ratio imprinted structure 5 forms a privacy screen, a wire grid polarizer, a plasmonic device, a grating, a light-guide structure, an electrical conductor, or an electromagnetic radiation absorber. For example, if the deposited material 50 is opaque or light absorbing, an array of micro-channels 30 with deposited material 50 can form a privacy screen, especially if the aspect ratio of the deposited material 50 is greater than 10. Structures of the present invention useful for optical applications can have thicknesses of, for example less than 500, 500 to 1,000, or greater than 1,000 Angstroms.

In a useful embodiment, the separation S (FIG. 1) between the micro-channels 30 is on the order of W, the width of the micro-channels 30 so that the micro-channel walls 32 and the deposited materials 50 are regularly and evenly distributed in the first layer 20, forming a uniform privacy screen. Such a uniform spacing of the deposited materials 50 is also useful in forming wire grid polarizers, plasmonic devices, or optical gratings (for example useful in providing diffractive optical effects). When oriented with the thin side of the high-aspect-ratio imprinted structure 5 toward a viewer, the present invention provides transparent structures that are more transparent than structures with a lower aspect ratio. Thus, the present invention is useful in applications requiring a high degree of transparency, for example in optical applications, display applications, and lighting applications.

Figure 4:
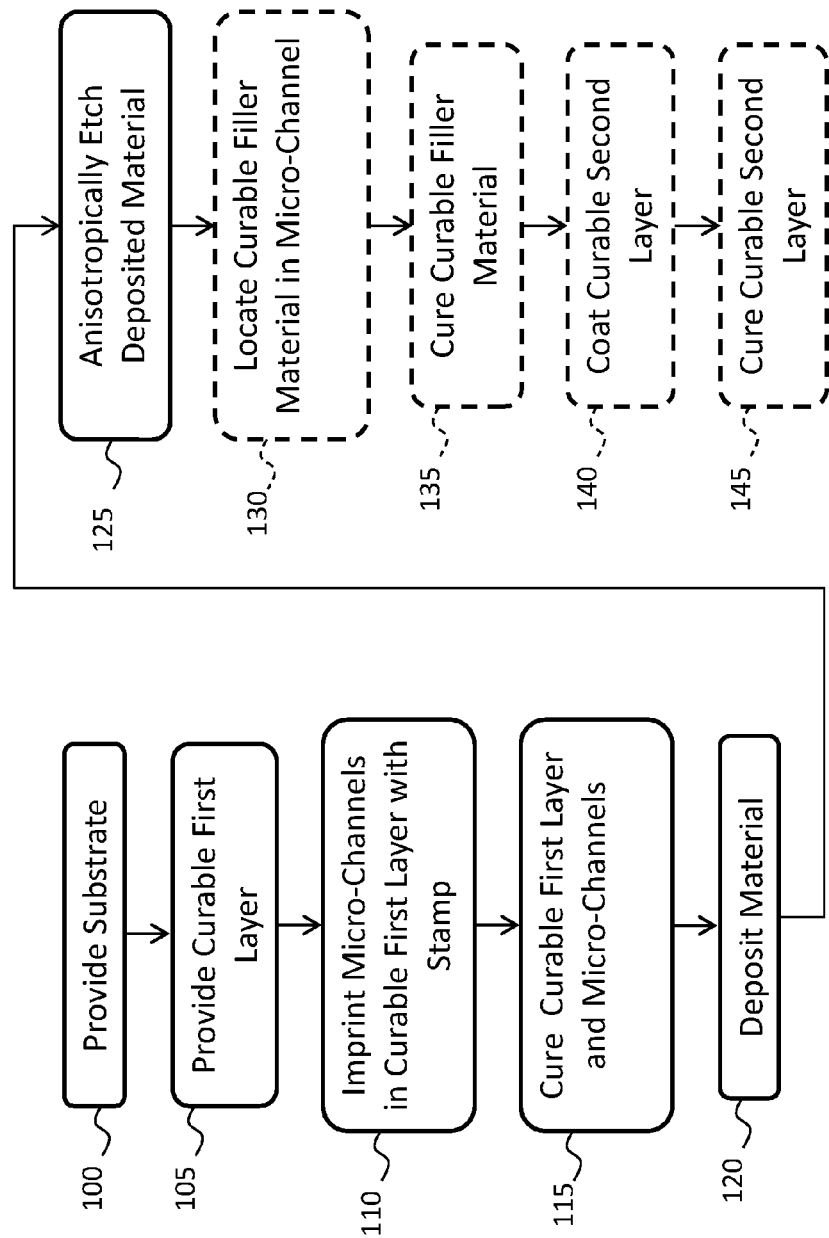

Referring to FIG. 4, a method of making a high-aspect-ratio imprinted structure 5 of the present invention includes providing the substrate 10 in step 100. The curable first layer 20 is provided in step 105 on the substrate surface 12 and imprinted in step 110 with a plurality of micro-channels 30 in the curable first layer 20. The curable first layer 20 is cured in step 115 to form the cured first layer 20 having the imprinted micro-channels 30. Each micro-channel 30 has the micro-channel bottom 34 and the micro-channel walls 32, the micro-channel bottom 34 having distinct first and second portions 36, 38, respectively.

In step 120, the material 50 is deposited on the cured first layer 20 and in each micro-channel 30 on the micro-channel walls 32 and on both the first and second portions 36, 38 of the micro-channel bottom 34. The deposited material 50 is anisotropically etched in step 125 to remove the deposited material 50 from the cured first layer 20 and the second portion 38 of the micro-channel bottom 34, leaving the deposited material 50 on the micro-channel walls 32 and first portion 36 of the micro-channel bottom 34.

In optional step 130, the curable filler material 40 is located in the micro-channels 30 between the deposited materials 50 and on only the second portion 38 of the micro-channel bottom 34 and cured in optional step 135 to form the cured filler material 40.

In optional step 140, the second layer 60 of curable material is coated over the first layer 20 and cured in step 145 to form the cured second layer 60. In one embodiment, locating the curable filler material 40 (step 130) and coating the curable second layer 60 (step 140) are the same step. Referring to FIG. 5, in such an embodiment, curable material is coated over the first layer 20 and into the micro-channels 30 between the deposited materials 50 in one step (step 150) and both the filler material 40 and the second layer 60 are cured in a common curing step (step 155). In another embodiment, referring to FIG. 6, the curable material is coated over the first layer 20 and at least partially into the micro-channels 30 between the deposited materials 50 in one step (step 150), the second layer 60 is removed (step 153) without removing all of the curable filler material 40 in the micro-channels 30, and the remaining filler material 40 is cured in step 135.

In further embodiments of the present invention, the first-layer curing step 115 only partially cures the first layer 20. The subsequent second-layer curing step 145 cures both the first layer 20 and the second layer 60 so that the two layers are cross linked together, forming a more mechanically and environmentally robust structure. Alternatively or in addition, the filler-material curing step 135 only partially cures the filler material 40. The subsequent second-layer curing step 145 cures both the filler material 40 and the second layer 60 so that the filler material 40 and the second layer 60 are cross linked together, forming a more mechanically and environmentally robust structure. In another alternative, both the first layer 20 and the filler material 40 are partially cured in steps 115 and 135, respectively, and are both cross linked to the second layer 60 when the second layer 60 is cured in step 145. If both the second layer 60 and the filler material 40 are deposited together (step 150, FIG. 6) they can be cross linked and cured together with the partially cured first layer 20 in step 155 (FIG. 5).

Figure 8:
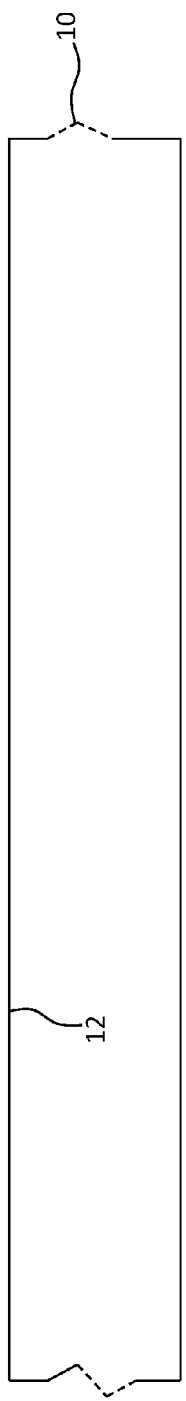
Figure 9:
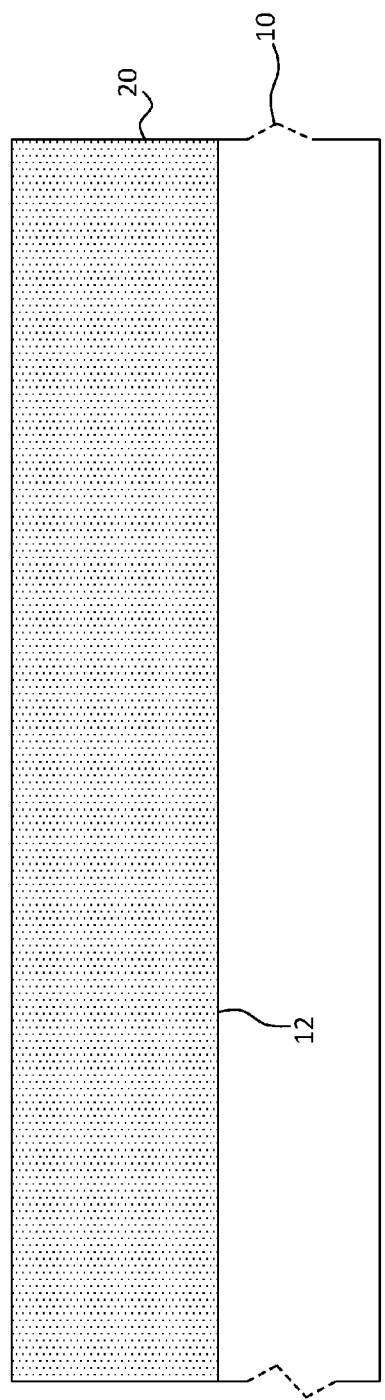

FIGS. 8-19 illustrate successive stages in forming embodiments of the high-aspect-ratio imprinted structure 5 of the present invention. Referring to FIG. 8, the substrate 10 having the substrate surface 12 is provided (step 100) and the curable first layer 20 is coated on the substrate surface 12 of the substrate 10 (step 105, FIG. 9). The substrate 10 is any of a variety of known materials, including glass, plastic and is rigid or flexible. Useful substrates 10 having suitable substrate surfaces 12 are known in the art. The coating is performed using any of a variety of known coating methods including spray coating, curtain coating, hopper coating, slot coating, or transfer coating; such methods are well known in the substrate processing arts. The coated material can be a resin or polymer, or a cross-linkable resin or polymer, provided in liquid form that is cured or partially cured into a solid state through heat or radiation.

Figure 10:
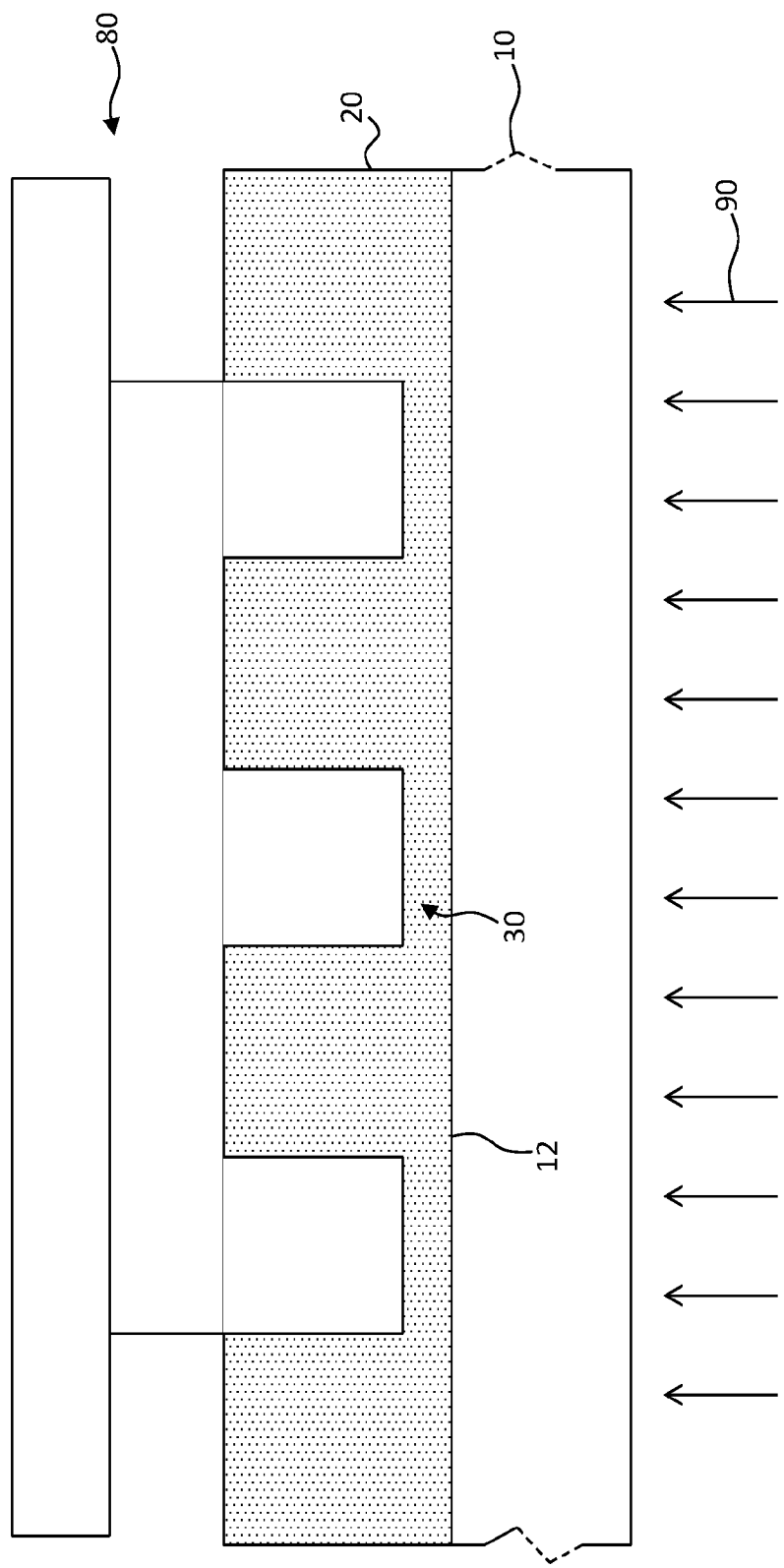

Referring next to FIG. 10, a stamp 80 is imprinted into the curable first layer 20 on the substrate surface 12 of the substrate 10 to form the micro-channels 30 in the first layer 20. Radiation 90 (or heat) is provided to cure the curable material of the first layer 20. The stamp 80 is removed to form the imprinted micro-channels 30 in the cured first layer 20 on the substrate surface 12 of the substrate 10 (step 115), as shown in FIG. 11. Methods of forming stamps having a structure that is the inverse of the micro-channels 30 are known in the art, as are methods for imprinting the first layer 20 with the stamp 80 and curing the first layer 20 with the radiation 90 (or heat).

As shown in FIG. 12, material 50 is deposited on the first layer 20, the micro-channel walls 32, and the micro-channel bottom 34 in step 120 using methods known in the art, for example evaporation, sputtering, reactive sputtering, or atomic layer deposition (ALD). In particular, ALD is a uniform and conformal deposition process that forms a uniformly thick layer over a three-dimensionally structured surface regardless of the orientation or shape of various portions of the structured surface. As shown in FIG. 12, an ALD process provides a coating that is uniform on the micro-channel wall 32, the micro-channel bottom 34, and the top of the cured first layer 20. A wide variety of materials are known, including metals, that are deposited with evaporation, sputtering with a material source, or ALD and the present invention is not limited to these methods. These deposition methods are known in the art and can deposit layers on structured substrates. If a sputtering process is used in an embodiment, the material source is oriented and rotated at an angle to the substrate surface 12 that is not orthogonal to the substrate surface 12 of substrate 10. Thus, material from the material source travels from the material source towards the substrate surface 12 at corresponding angles that are not orthogonal to the substrate surface 12. Such orientations can increase the deposition of materials on vertical surfaces such as the micro-channel walls 32.

A thin (1000 Angstrom) conformal layer has been deposited on an imprinted polymer substrate using atomic layer deposition (ALD). The imprinted micro-channels 30 had a depth of up to 30 microns, forming a high-aspect-ratio imprinted structure 5 with an aspect ratio greater than 3,000. If a thinner layer is deposited, for example 10 Angstroms (readily achievable with ALD techniques), aspect ratios of 30,000 or more are achieved on a vertical surface orthogonal to the substrate surface 12.

Figure 13:
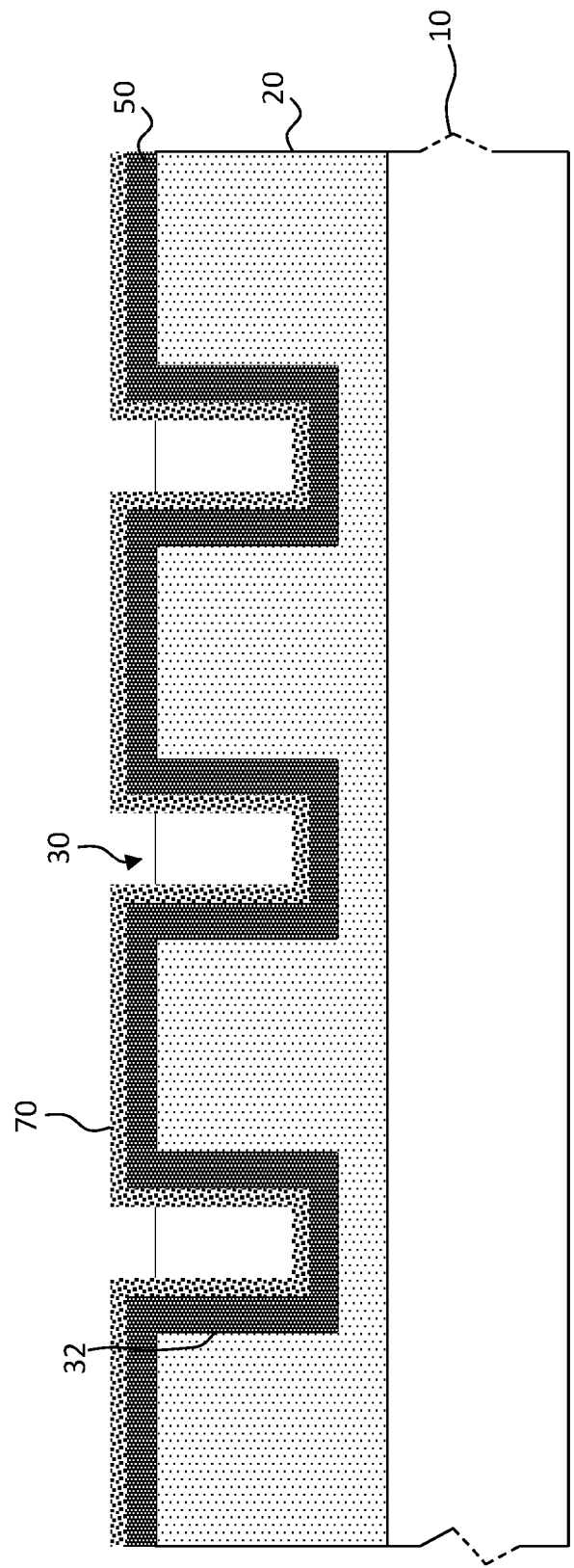
Figure 14:
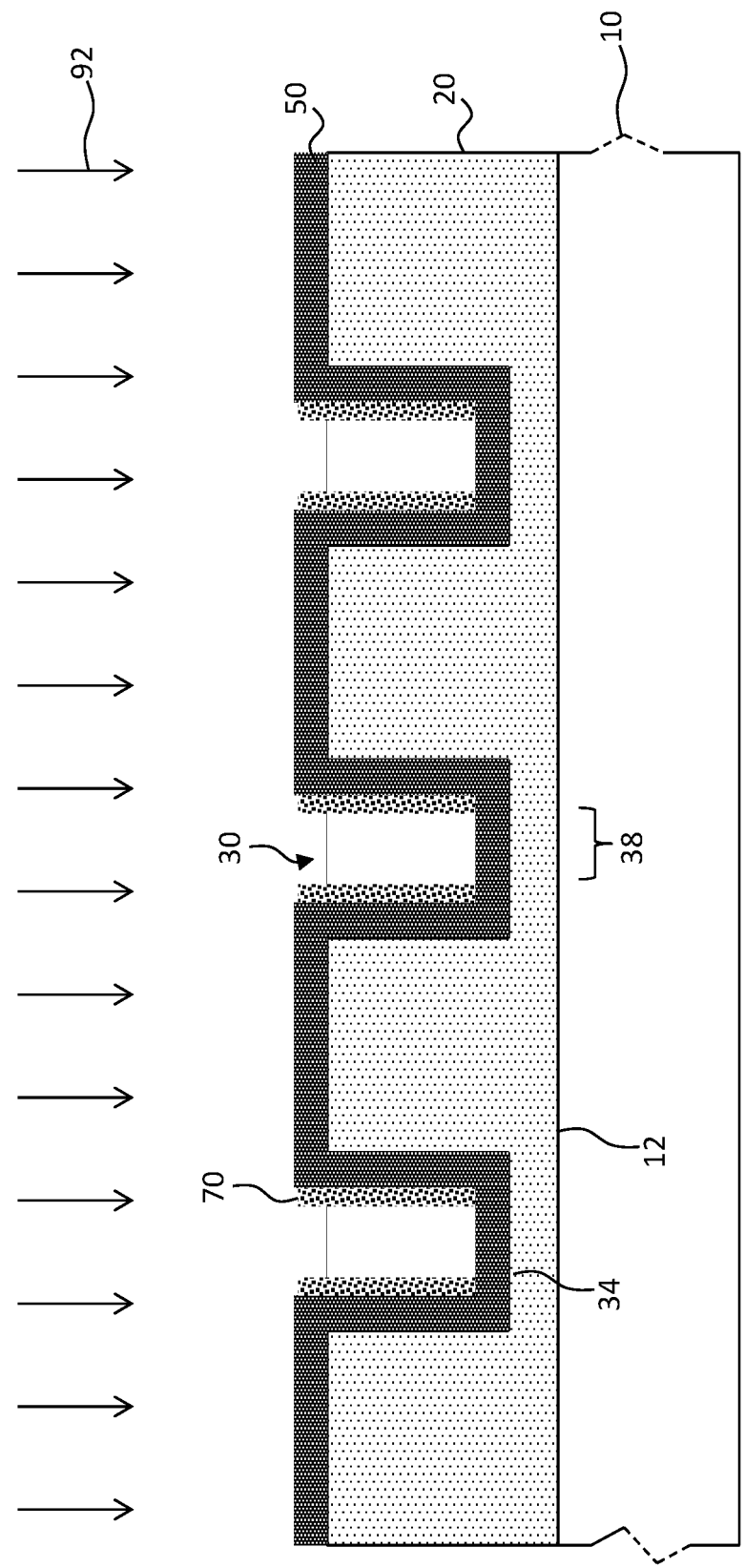

Referring to FIGS. 7 and 13 according to a further embodiment of the present invention, an optional oxide layer 70 is formed in step 160 on the deposited material 50 on the micro-channel walls 32 of the micro-channels 30 formed in the first layer 20 on the substrate 10, for example using evaporation, sputtering, or ALD. Referring to FIG. 14, the optional oxide layer 70 is anisotropically etched (step 165) with an anisotropic etchant 92 to remove the oxide layer 70 from the horizontal surfaces (those parallel to the substrate surface 12 of the substrate 10), leaving the deposited materials 50 in place. Suitable oxides are known in the art and include silicon oxide. In FIG. 14, the oxide layer 70 is absent from the first layer 20 and the second portion 38 of the micro-channel bottom 34 of the micro-channels 30 in the cured first layer 20.

Figure 15:
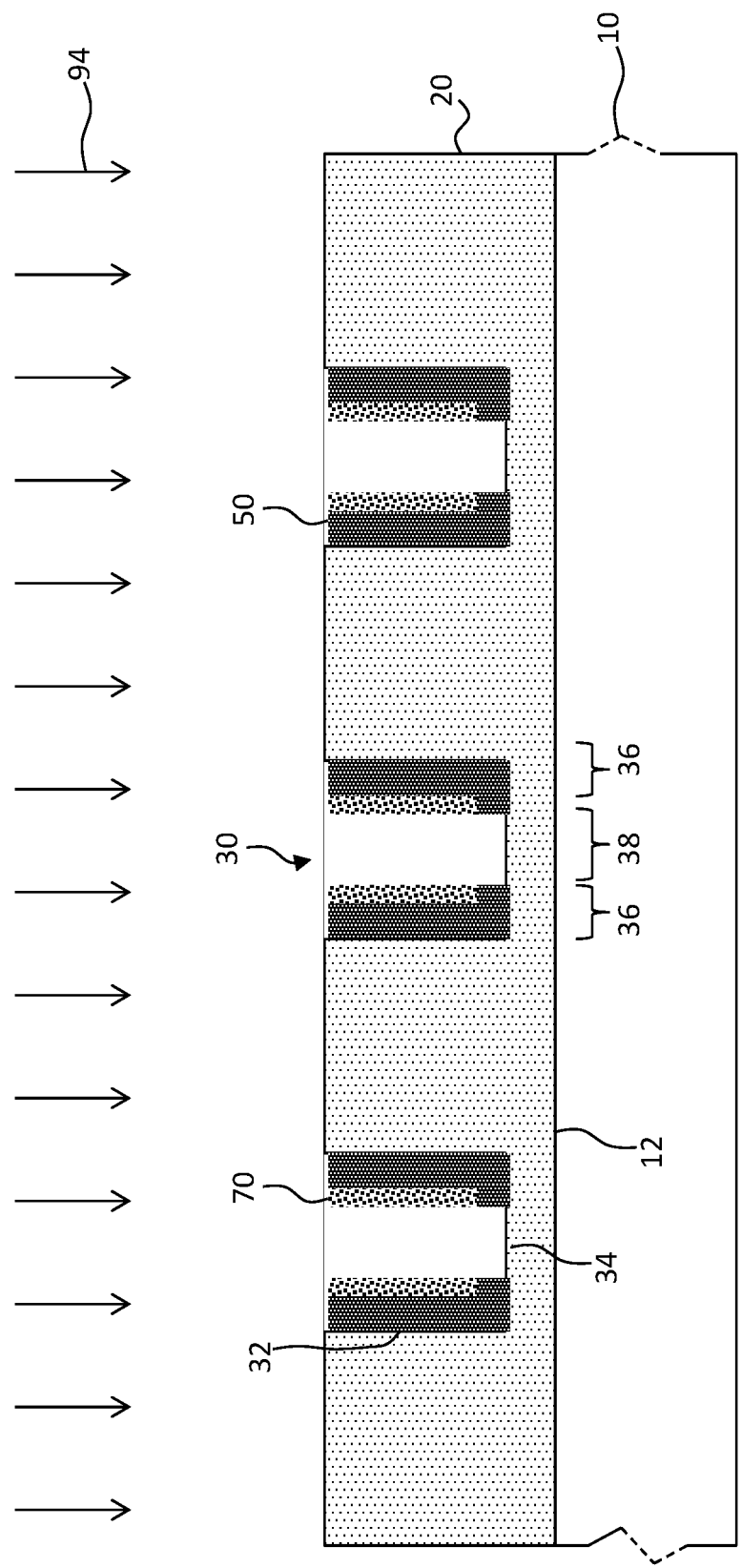

Referring next to FIG. 15, the deposited material 50 is anisotropically etched in step 125 with an anisotropic etchant 94 to remove the deposited material 50 from the horizontal surfaces (those parallel to the substrate surface 12 of the substrate 10). In FIG. 15, the deposited material 50 is absent from the first layer 20 and the second portion 38 of the micro-channel bottom 34 of the micro-channels 30 in the cured first layer 20 and present on the micro-channel walls 32.

In an embodiment, a suitable anisotropic etchant is a low-pressure plasma or an ion beam. A useful low-pressure plasma can optionally include a passivating gas or a fluorocarbon. Such etching processes and materials are known in the art.

The oxide layer 70 is very thin, even compared to the deposited material 50, for example only a few Angstroms thick, for example as deposited with ALD, evaporation, or sputtering. Hence, the cross section of the deposited material 50 is described as substantially rectangular despite any additional deposited material 50 on the micro-channel bottom 34 due to the etch protection of the oxide layer 70. Furthermore, it is often the case that the anisotropic etchant 94 that removes the deposited material 50 from the horizontal surfaces (step 125) can undercut the oxide layer 70 so that there is no additional deposited material 50 on the micro-channel bottom 34 or can remove additional deposited material 50 on the micro-channel bottom 34 between the oxide layer 70 and the micro-channel walls 32. According to embodiments of the present invention, the first portions 36 of the micro-channel bottom 34 refer to the portion of the micro-channel bottom 34 that has deposited material 50 after the processing is complete and are only approximate representations that can vary depending on the anisotropic etchant 94 and related processing conditions (such as time and temperature).

Figure 16:
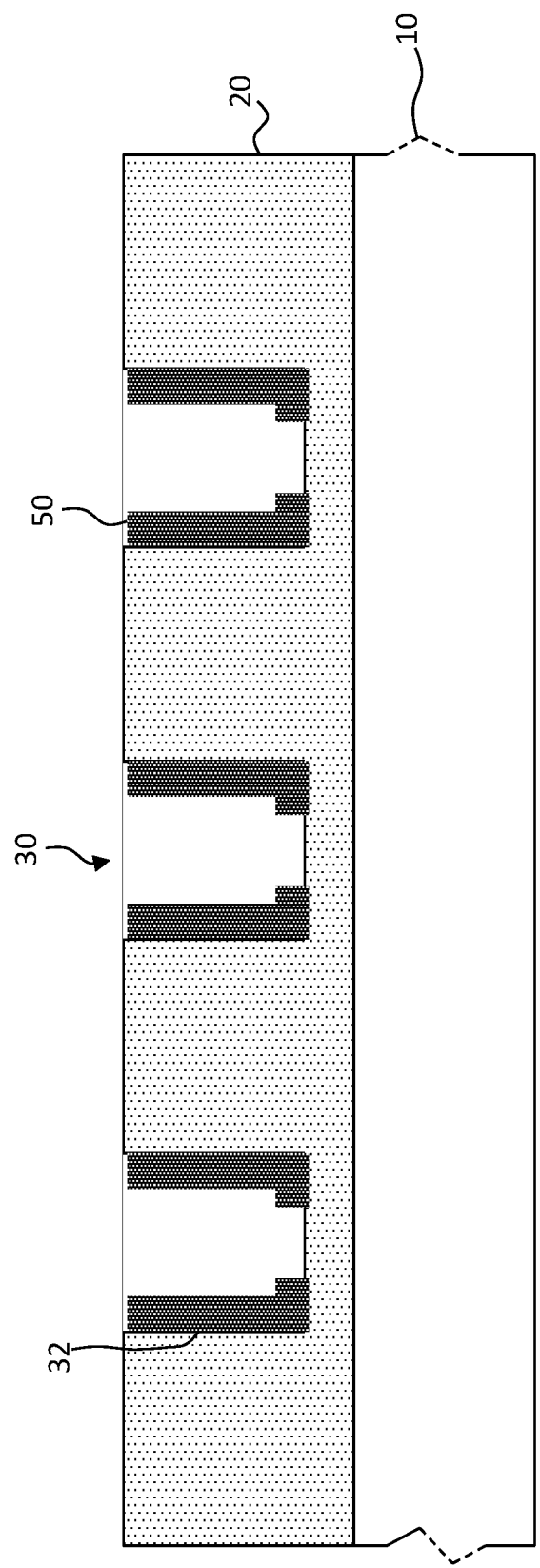

The optional oxide layer 70 is optionally deposited to enhance the anisotropic capability of the anisotropic etchant 94 by resisting the action of the anisotropic etchant 94 and protecting the deposited material 50 on the micro-channel wall 32, thereby providing a more predictable method for defining the thickness and the surface quality of the deposited material 50. Surface quality is an important attribute for some applications, such as plasmonic structures and wire-grid polarizers. Referring to FIG. 16, the oxide is optionally removed in step 170 (FIG. 7) using a suitable etchant; the etchant need not be anisotropic, leaving the deposited material 50 on the micro-channel walls 32 of the micro-channels 30 in first layer 20 on substrate 10. For example, a wet etch is used to remove the rest of the metal after the anisotropic oxide etch. Suitable etchants are known in the art.

Figure 17:
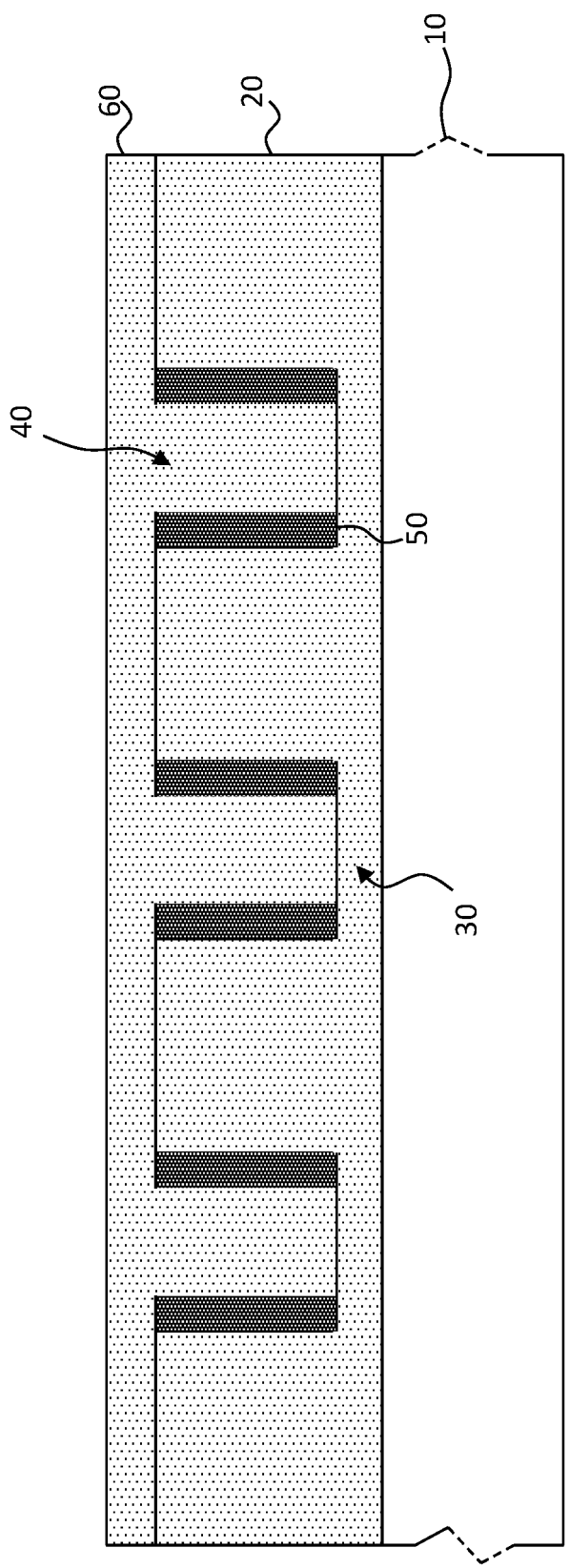
Figure 18:
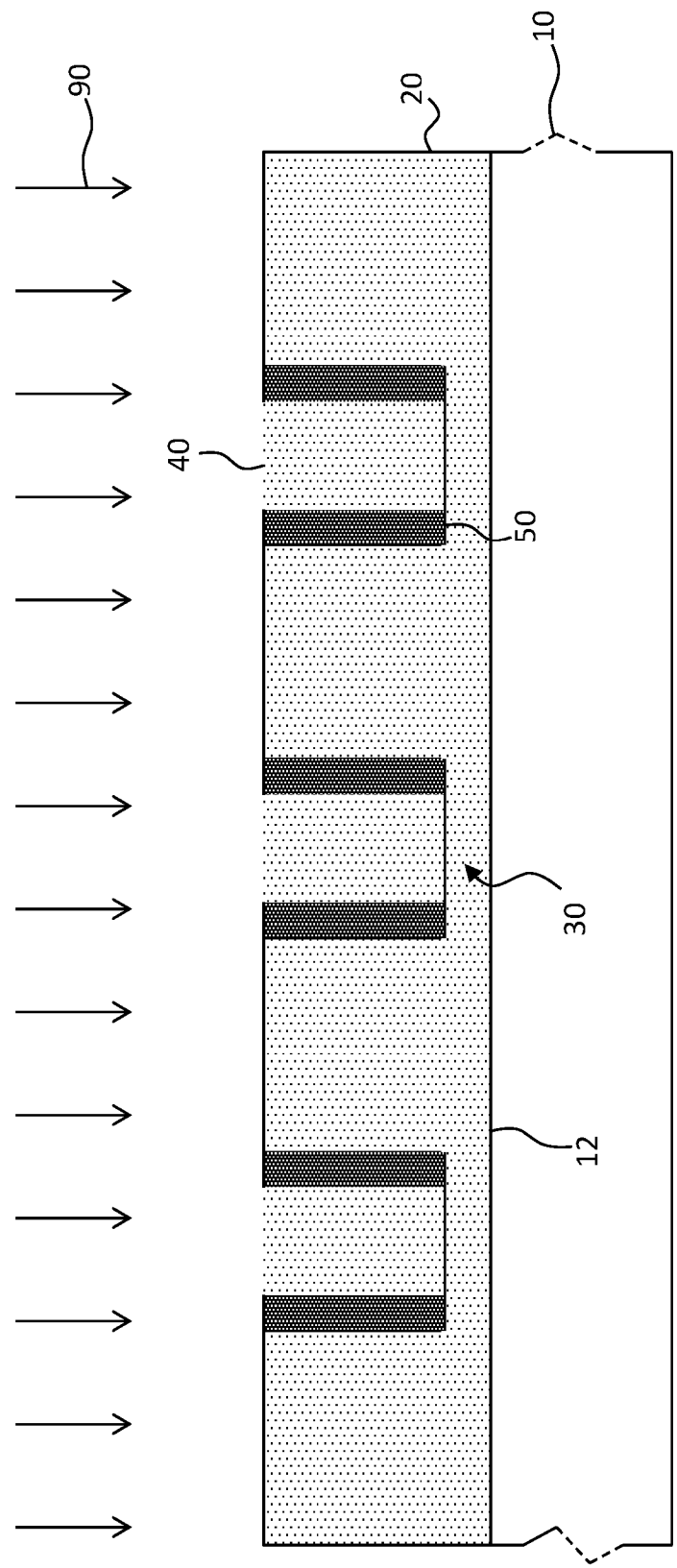
Figure 19:
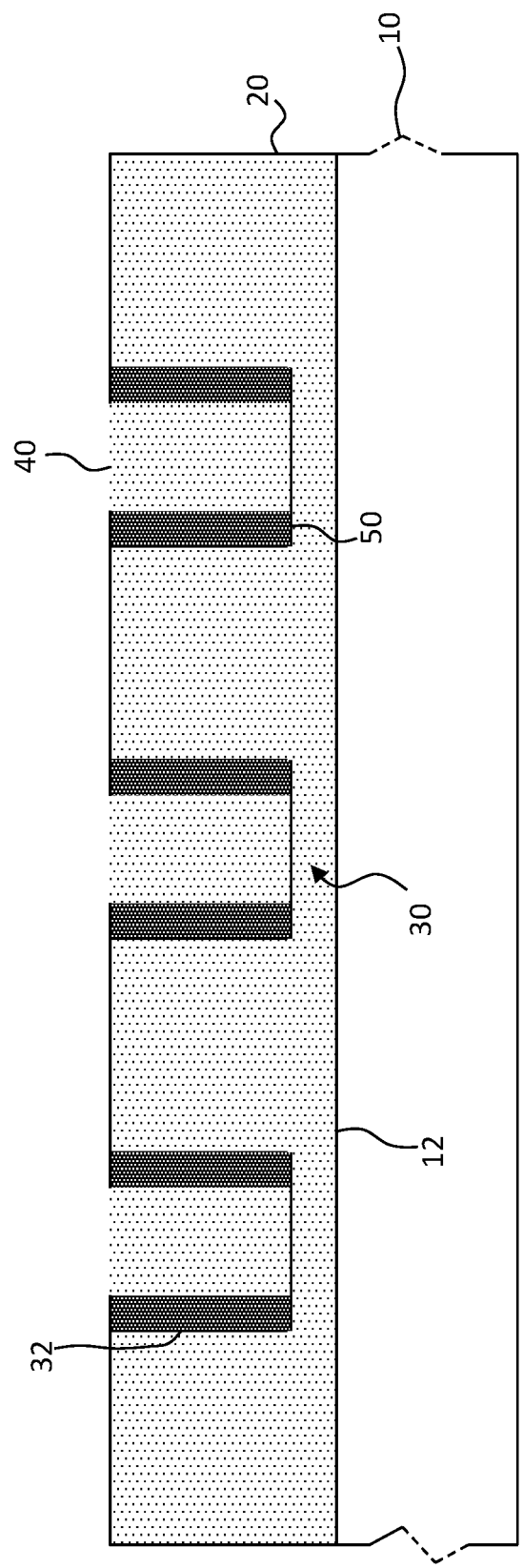

Referring next to FIG. 17, a curable material is coated in step 150 over the first layer 20 on substrate 10 and over the deposited material 50 to form the second layer 60. The same coating step 150 also provides the curable filler material 40 in the micro-channels 30. Alternatively, a curable material is laminated over the first layer 20 and heated to fill the micro-channels 30. As illustrated in FIG. 18, the second layer 60 of FIG. 17 is optionally removed (step 153) and radiation 90 cures the filler material 40 in step 135, providing the substrate 10 with the cured first layer 20 on the substrate surface 12 having the micro-channels 30 with the deposited material 50 on the micro-channel walls 32 and the filled material 40 in the micro-channels 30 between the deposited material 50 on the micro-channel walls 32 (FIG.

19). Alternatively, as shown in FIG. 1, the second layer 60 of FIG. 17 is not removed and radiation 90 cures the filler material 40 and the second layer 60 in step 155.

According to further embodiments of the present invention, additional layers, for example protective or anti-reflective layers are formed on the first layer 20 and micro-channels 30 or second layer 60 (not shown). Anti-reflective layers serve to reduce reflections from the surface of the first layer 20 and micro-channels 30 or second layer 60.

In yet another embodiment of the present invention, the high-aspect-ratio imprinted structure 5 of the present invention is incorporated as a component into a system including a display 14 (FIG. 2) having a display substrate and a display cover. In various embodiments, the substrate 10 is the display cover or substrate 10 and the cured first layer 20 is formed on, or laminated to, the display cover or display substrate. The display 14 is, for example, a liquid crystal display or an organic light-emitting diode (OLED) display.

The present invention provides a useful method for forming high-aspect-ratio structures on a surface vertical to the extent of a substrate. Conventional deposition methods employ line-of sight deposition methods, for example evaporation or sputtering, that do not readily deposit materials on vertical surfaces, or methods that coat materials over an entire surface, causing difficulties in forming high-aspect ratio structures on vertical surfaces alone.

According to various embodiments of the present invention, the substrate 10 is any material having the substrate surface 12 on which the curable first layer 20 is formed. For example, glass and plastic are suitable materials known in the art from which the substrates 10 are made into sheets of material having substantially parallel opposed sides, one of which is the substrate surface 12. In various embodiments, the substrate 10 is rigid, flexible, or transparent.

The substrate 10 can have a wide variety of thicknesses, for example 10 microns, 50 microns, 100 microns, 1 mm, or more. In various embodiments of the present invention, the substrate 10 is provided as an element of other devices, for example a display cover or display substrate of the display 14 or the curable first layer 20 is coated on another underlying substrate 10, for example by coating a curable polymer layer on an underlying glass substrate 10, such as a display cover. Alternatively, the substrate 10 is affixed to a display 14 or other device.

The imprinted micro-channel 30 is a groove, trench, structure, or channel formed in the curable first layer 20 and extending from the surface of the first layer 20 toward the substrate 10 and having a cross-sectional width W, for example less than or equal to 20 microns, 10 microns, 5 microns, 4 microns, 3 microns, 2 microns, 1 micron, or 0.5 microns. In an embodiment, the cross-sectional depth D of the imprinted micro-channel 30 is greater than or equal to twice the width W, five times the width W, ten times the width W, 15 times the width W, twenty times the width W, thirty times the width W, or fifty times the width W. The micro-channels 30 can have a rectangular cross section, as shown. Other cross-sectional shapes, for example trapezoids, are known and are included in the present invention.

Material compositions useful in the curable first layer 20, the curable second layer 60, or the curable filler material 40 are provided in one state and then processed into another state, for example converted from a liquid state into a solid state. Such conversion is accomplished in a variety of ways, for example by drying or heating. Furthermore, useful material compositions can include a set of materials that, after deposition and processing, are reduced to a subset of the set of materials, for example by removing solvents from the material composition. For example, a material composition including a solvent is deposited and then processed to remove the solvent leaving a material composition without the solvent in place. Thus, according to embodiments of the present invention, a material composition that is deposited on the substrate 10 or in the imprinted micro-channels 30 is not necessarily the same composition as that found in the cured material composition.

Curing material compositions such as those in the curable first layer 20 is done by drying or heating in stages. Such heating is done by convective heating (putting substrate 10 into an oven) or by infrared radiation.

The present invention is useful in a wide variety of electronic or optical devices. Such devices can include, for example, photovoltaic devices, OLED displays and lighting, LCD displays, plasma displays, inorganic LED displays and lighting, electrophoretic displays, electrowetting displays, dimming mirrors, smart windows, transparent radio antennae, transparent heaters and other optical devices.

The invention has been described in detail with particular reference to certain embodiments thereof, but it will be understood that variations and modifications can be effected within the spirit and scope of the invention.

PARTS LIST

A cross section line
D depth
S separation distance
T thickness
W width
W2 width
5 high-aspect-ratio imprinted structure
10 substrate
12 substrate surface
14 display
20 first layer
30 micro-channel
32 micro-channel wall
34 micro-channel bottom
36 first portion
38 second portion
40 filler material
50 deposited material
60 second layer
70 oxide layer
80 stamp
90 radiation
92 anisotropic etchant
94 anisotropic etchant
100 provide substrate step
105 provide curable first layer step
110 imprint micro-channels in curable first layer with stamp step
115 cure curable first layer and micro-channels step
120 deposit material step
125 anisotropically etch deposited material step
130 optional locate curable filler material in micro-channel step
135 optional cure curable filler material step
140 optionally coat curable second layer step
145 optionally cure curable second layer step
150 coat curable second layer and curable filler material in a common step
153 remove curable second layer step
155 cure curable filler material and cure curable second layer in a common step 160 coat oxide layer step
165 anisotropically etch oxide layer step
170 remove oxide layer step

The invention claimed is:

1. A high-aspect-ratio imprinted structure, comprising:
a first layer of cured layer material having a surface and a plurality of micro-channels imprinted in the first layer, each micro-channel having a length, micro-channel walls, and a micro-channel bottom, the micro-channel bottom having distinct first and second portions; and
deposited material located on the micro-channel walls and not on the second portion of the micro-channel bottom, wherein the micro-channels extend over the first layer to define a length, and wherein the micro-channels and the deposited material on the micro-channel walls have a substantially rectangular cross section taken in a direction perpendicular to the length of the micro-channels and perpendicular to the surface of the first layer, and wherein the deposited material has a transmissivity of less than 50% and is not present on the surface of the first layer.

2. The high-aspect-ratio imprinted structure of claim 1 further including a second layer over the first layer and the deposited material.

3. The high-aspect-ratio imprinted structure of claim 2 wherein the second layer includes the cured layer material.

4. The high-aspect-ratio imprinted structure of claim 1 further including a cured filler material in each micro-channel between the deposited materials and on only the second portion of the micro-channel bottom.

5. The high-aspect-ratio imprinted structure of claim 4 wherein the cured layer material is the same as the cured filler material.

6. The high-aspect-ratio imprinted structure of claim 4 further including a second layer over the first layer, the deposited material, and the cured filler material.

7. The high-aspect-ratio imprinted structure of claim 1 wherein the micro-channels extend only partially through the first layer.

8. The high-aspect-ratio imprinted structure of claim 1 wherein the micro-channels extend through the first layer.

9. The high-aspect-ratio imprinted structure of claim 1 further including a substrate having a surface on which the first layer is located.

10. The high-aspect-ratio imprinted structure of claim 9 wherein the substrate surface is a display cover or a display substrate.

11. The high-aspect-ratio imprinted structure of claim 1 wherein the deposited material has a cross section having an aspect ratio greater than 2.

12. The high-aspect-ratio imprinted structure of claim 1 wherein the deposited material has a cross section having an aspect ratio greater than 5.

13. The high-aspect-ratio imprinted structure of claim 1 wherein the deposited material has a cross section having an aspect ratio greater than 10.

14. The high-aspect-ratio imprinted structure of claim 1 wherein the deposited material has a cross section having an aspect ratio greater than 20.

15. The high-aspect-ratio imprinted structure of claim 1 wherein the deposited material is a metal or includes a metal.

16. The high-aspect-ratio imprinted structure of claim 1 wherein the micro-channels are spaced apart by an amount greater than or equal to the width of the micro-channel.

17. The high-aspect-ratio imprinted structure of claim 1 wherein the first cured material is a cross-linked material, a resin, or a polymer.

18. The high-aspect-ratio imprinted structure of claim 1 wherein the micro-channel has a cross section parallel to the surface of the first layer that is not rectangular.

19. The high-aspect-ratio imprinted structure of claim 6, wherein the first and second layers are cross linked or wherein the second layer and filler material are cross linked.

20. The high-aspect-ratio imprinted structure of claim 1, wherein the high-aspect-ratio structure is a privacy screen, a wire grid polarizer, a plasmonic device, or a grating.

* * * * *